No. 652,529. Patented June 26, 1900.
A. V. BRYCE.
NUT LOCK.
(Application filed Sept. 19, 1899.)
(No Model.)
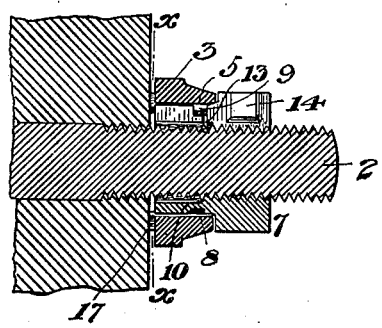
Fig. 1.
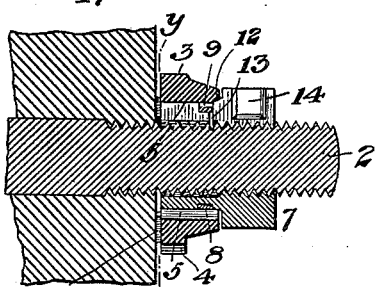
Fig. 2.
Fig. 10.
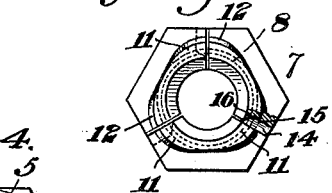
Fig. 3.
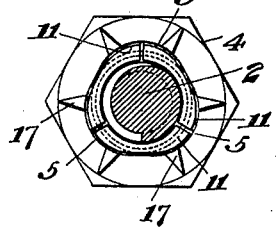
Fig. 4. Fig. 5.
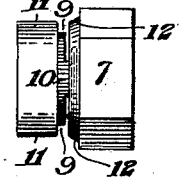
Fig. 6. Fig. 7.
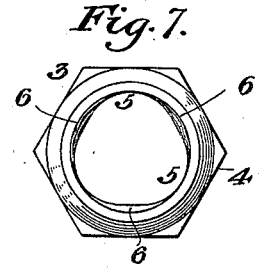
Fig. 8.
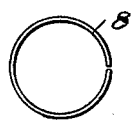
Fig. 9.
WITNESSES
INVENTOR
Andrew V. Bryce
by Balcwell & Balcwell
his attys.
THE NORRIS PETERS CO., PHOTO-LITHO., WASHINGTON, D. C.

UNITED STATES PATENT OFFICE.

ANDREW V. BRYCE, OF ALLEGHENY, PENNSYLVANIA, ASSIGNOR OF NINE-TWENTIETHS TO GEORGE B. WIX, OF SAME PLACE.

NUT-LOCK.

SPECIFICATION forming part of Letters Patent No. 652,529, dated June 26, 1900.

Application filed September 19, 1899. Serial No. 730,969. (No model.)

*To all whom it may concern:*

Be it known that I, ANDREW V. BRYCE, of Allegheny, in the county of Allegheny and State of Pennsylvania, have invented a new and useful Improvement in Nut-Locks, of which the following is a full, clear, and exact description, reference being had to the accompanying drawings, forming part of this specification, in which—

Figure 1 is a longitudinal sectional view showing my improved nut-lock, the parts being in a partially-unlocked position. Fig. 2 is a like view, the parts being in a locked position. Fig. 3 is a front view of the nut. Fig. 4 is a cross-sectional view on the line X X of Fig. 1, the parts being in an unlocked position. Fig. 5 is a like view on the line y y of Fig. 2, the parts being in a locked position. Fig. 6 is a side view of the nut. Fig. 7 is a plan view of the same. Fig. 8 is an interior side view of one of the sections of the nut, and Fig. 9 is a view of the ring that holds the nut-sections together. Fig. 10 is a rear view of a modified form of nut.

Like symbols of reference indicate like parts wherever they occur.

In the drawings, 2 represents the bolt, screw-threaded in the ordinary manner. Fitting over the bolt is the washer 3, having the hexagonal shoulder 4, which washer, instead of being a true annulus on its inner circumference, is provided with one or more cam-surfaces 5, the inner sides of the washer being parallel with the bolt, and at its mouth with two or more beveled faces 6. The nut 7 is preferably formed in two or more sections on longitudinal lines, which sections may be held together by a split ring 8, which fits in a recess 9 in the neck of the nut. This neck 10 of the nut is reduced in its outer circumference to be inserted within the inner circumference of the washer 3 and is provided with one or more cam-surfaces 11 to correspond with and be adapted to bind the cam-faces 5 of the inner circumference of the washer, and at the shoulder of the nut it is provided with two or more beveled projections 12, adapted to engage with and bind in and distort the beveled surfaces 6 at the mouth of the washer 3. The outer portion of the inner circumference of the nut is provided with a screw-thread; but the inner circumference of the spring-neck 10 of the nut has a smooth surface. The outer face of this neck 10 is slotted at 13 to render it flexible and compressible.

The operation is as follows: The several sections of the nut being held together by the open ring 8, the washer 3 is placed over the bolt 2 and the nut is screwed down on the bolt against the washer, the neck of the nut entering the inner circumference of the washer. When the projections 12 come in contact with the beveled faces 6, the separable sections of the nut are caused to bind on the bolt, producing the first lock. The sections of the nut are held in proper relation to each other by a projection 14 in one section fitting in a recess 15 in another section, and the bases of these projections and recesses are beveled, as at 16. As the nut locks, this bevel tends to throw the sections askew and causes them to bind firmly on the screw-thread of the bolt, thus forming a second lock. The third lock is caused by turning the washer 3 on the neck 10 of the nut, which brings the cam-surfaces 5 and 11 in binding contact and presses or jams the flexible and compressible neck of the nut tightly on the thread of the bolt. The inner face of the washer 3 is provided with ribs 17, that tend to keep the washer from turning. It should be noted that the bore or inner circumference of the nut and washer is parallel with the bolt and not tapered, the cam-surfaces being transverse to the axis, which enables the parts to be formed by drop-forging.

The advantages of my invention will be apparent to those skilled in the art. Instead of forming the nut in sections it may be slotted, as shown in Fig. 10, and I desire to cover this construction by the term "nut formed in sections" as used in the claims.

Having thus described my invention, what I claim, and desire to secure by Letters Patent, is—

1. In a nut-lock, the combination of a washer having beveled surfaces at its mouth, and a nut formed in separate longitudinally-divided sections and provided with projections adapted to engage with the beveled surfaces at the mouth of the washer; substantially as described.

2. In a nut-lock, the combination of a washer, having an enlarged cavity with beveled surfaces at the mouth of the cavity, and a nut formed in separate longitudinally-divided sections having a neck adapted to be inclosed within the cavity of the washer, and having projections adapted to engage with the beveled surfaces at the mouth of the washer; substantially as described.

3. In a nut-lock, the combination of a washer having an enlarged cavity, one or more longitudinal cam-faces, and a nut formed in separate longitudinally-divided sections having a neck with one or more longitudinal cam-surfaces; substantially as described.

4. In a nut-lock, the combination of a washer having exterior wrench-faces and an enlarged inner cavity provided with one or more cam-faces, and a threaded nut formed in separate longitudinally-divided sections and having a neck provided with one or more cam-faces adapted to coact with the cam-faces of the washer; substantially as described.

5. In a nut-lock, the combination of a bolt, a washer having an enlarged cavity provided with one or more cam-faces, a nut formed in sections and having a neck which is transversely slotted and is provided with one or more cam-faces: substantially as described.

6. In a nut-lock, the combination of a washer having a beveled surface at its mouth, and a nut formed in sections provided with a projection and a recess at the meeting surfaces, said projection and recess being beveled at their base, and a projection adapted to engage with the bevel at the mouth of the washer: substantially as described.

7. In a nut-lock, the combination of a washer having exterior wrench-faces and an enlarged cavity with cam-faces, and a threaded nut having a compressible neck portion with cam-faces arranged to fit in the washer-cavity; substantially as described.

8. In a nut-lock, the combination of a nut formed in longitudinally-divided sections provided with a projection and recess at the meeting surfaces, said projection and recess being beveled at their base and a clamping-annulus for the nut; substantially as described.

9. In a nut-lock, the combination of a nut formed in sections and provided with a ring to hold the sections together and a clamping-annulus for the section; substantially as described.

10. In a nut-lock, a washer having an enlarged unthreaded cavity with interior rib-shaped cams parallel with the bolt, said washer having beveled faces at its mouth, and a nut having a compressible neck-section with cam-faces arranged to enter the washer, and provided with a bevel-face to engage the bevel-face of the washer; substantially as described.

11. In a nut-lock, a washer having exterior wrench-faces and provided with an extension having an enlarged eccentric cavity, and a beveled face at its mouth, and an internally-threaded nut having a neck arranged to fit in the cavity of the washer, and provided with beveled faces, substantially as described.

12. In a nut-lock, a washer having exterior wrench-faces and interior cam-faces, and a nut made in separate longitudinally-divided sections having engaging projections and recesses at their meeting surfaces, said nut having a compressible extension provided with cam-faces engaging the cam-faces of the washer; substantially as described.

In testimony whereof I have hereunto set my hand.

ANDREW V. BRYCE.

Witnesses:
GEO. B. BLEMMING,
H. M. CORWIN.